United States Patent [19]

Malla

[11] Patent Number: 5,717,404
[45] Date of Patent: Feb. 10, 1998

[54] SATELLITE EPHEMERIS DETERMINATION SYSTEM USING GPS TRACKING TECHNIQUES

[75] Inventor: Rajendra P. Malla, Manattan Beach, Calif.

[73] Assignee: Hughes Electronics, Los Angeles, Calif.

[21] Appl. No.: 648,268

[22] Filed: May 15, 1996

[51] Int. Cl.[6] .................................................. G15S 5/02
[52] U.S. Cl. ........................... 342/357; 342/352; 455/12.1
[58] Field of Search .................................. 342/352, 357; 455/12.1

[56] References Cited

U.S. PATENT DOCUMENTS

| | | | |
|---|---|---|---|
| 4,726,224 | 2/1988 | D'Ausilio | 73/167 |
| 4,746,976 | 5/1988 | Kamel et al. | 358/103 |
| 5,041,833 | 8/1991 | Weinberg | 342/357 |

Primary Examiner—Thomas H. Tarcza
Assistant Examiner—Dao L. Phan
Attorney, Agent, or Firm—Gordon R. Lindeen, III; Michael W. Sales; Wanda K. Denson-Low

[57] ABSTRACT

A system (10) for providing ephemeris data of a medium to high orbit satellite (12) relative to the Earth (30), where the satellite (12) is in an orbit substantially greater than 20,000 kilometers. The inventive system (10) includes plural transmitters (14, 16, 18, 20, 22, and 24) located within 20,000 kilometers of the Earth for transmitting information relating to the ephemeris of each transmitter relative to the Earth and time. This information is received and processed onboard the satellite (12) to provide ephemeris data. In a specific implementation, the transmitters (14, 16, 18, 20, 22, and 24) are GPS transmitters. One or more of the transmitters may be a ground or air based pseudolite. The transmitters have a geometric dilution of precision of six or less. Each pseuodlite transmitter includes a power supply sufficient to ensure that the signal received by the medium to high orbit satellite is of sufficient signal strength (e.g., −170 dBw to −160 dBw). Using one or more GPS pseuodlites and one or more GPS satellite transmitters, the ephemeris of a high or medium orbit satellite may be fixed precisely, inexpensively, in real time in an autonomous manner.

20 Claims, 6 Drawing Sheets

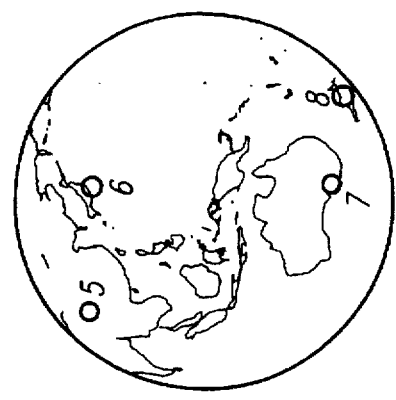
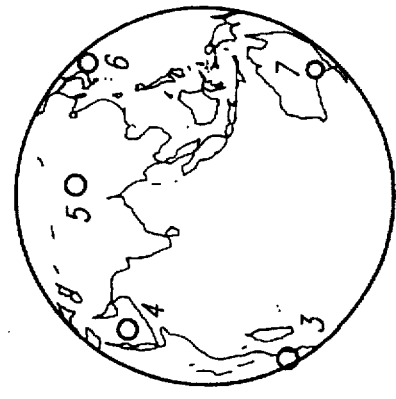
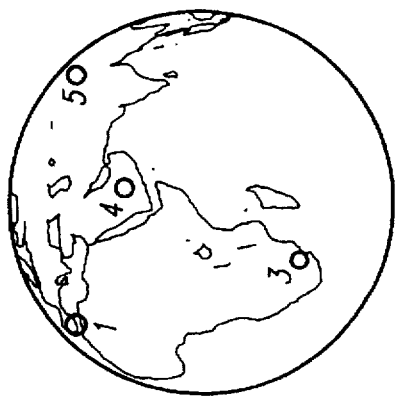
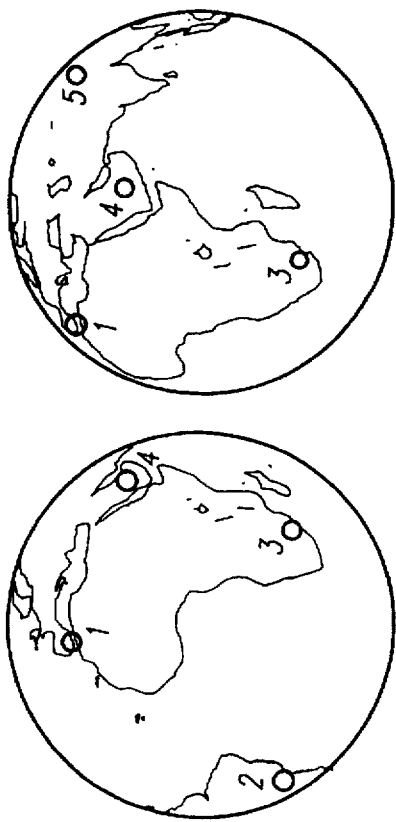
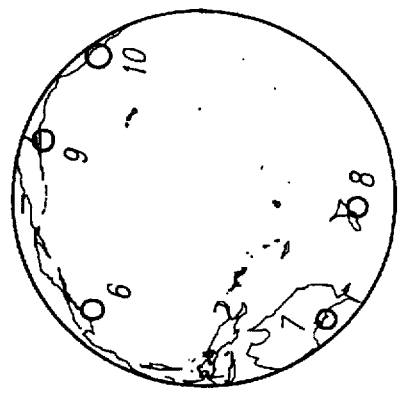
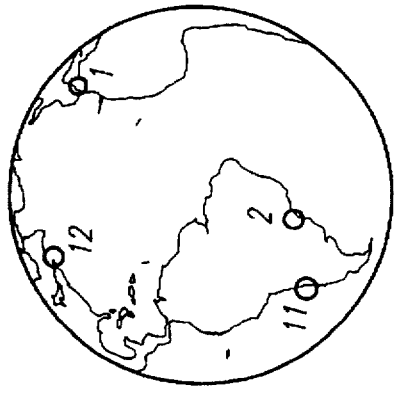
FIG. 11(A) 0°
FIG. 11(B) 45°
FIG. 11(C) 90°
FIG. 11(D) 135°
FIG. 11(E) -45°
FIG. 11(F) -90°
FIG. 11(G) -135°
FIG. 11(H) 180°

SATELLITE EPHEMERIS DETERMINATION SYSTEM USING GPS TRACKING TECHNIQUES

BACKGROUND OF THE INVENTION

1. Field of the Invention

The present invention relates to systems and techniques for fixing the orbit and attitude of a satellite. More specifically, the present invention relates to systems and techniques for fixing the orbit and attitude of medium and high orbit satellites.

2. Description of the Related Art

For many applications, satellites currently perform a valuable function. Such applications include communications, earth resource management, and navigation by way of example. For these and other applications, there is a need to accurately fix the precise location, orbital velocity, acceleration and orientation (known in the art as the ephemeris) of the satellite.

Currently, several methods are known and used in the art for fixing the ephemeris of a satellite. One method involves the use of ground based radar. However, this approach is costly as it is labor intensive, requires considerable data processing and is not autonomous.

Laser ranging techniques are known by which a laser beam, reflected off of the satellite is used to acquire the desired data. Unfortunately, this approach requires a plurality of expensive laser transmitting/receiving stations and a highly accurate clock. In addition, the data must be accumulated over a period of time. As a result, the system is neither real time nor autonomous. Furthermore, conventional laser ranging systems are not capable of operating in all weather conditions.

Another method involves the use of onboard star and sun sensors to fix satellite position. However, this approach is also data processing intensive and therefore does not provide real time orbit data.

The Doris satellite system built and launched by the French Space Agency CNES achieves satellite altitude determination with a plurality of ground based radio frequency transmitters which transmit position data to the satellite. Circuitry onboard the satellite then computes the satellites altitude and position by triangulation. However, this system suffers from the difficulty associated with the maintenance of the large number of ground based transmitters globally. Some ideal locations for transmitters may not be accessible.

Currently, the use of GPS receivers on low orbit satellites is being used. However, this approach will work only for low orbit satellites, i.e., those below 10,000 kilometers.

Accordingly, a need remains in the art for an accurate inexpensive, real time system for fixing satellite ephemeris that is autonomous with respect to attitude and orbit determination and station keeping requirements.

SUMMARY OF THE INVENTION

The need in the art is addressed by the present invention which provides a system for providing ephemeris data of a medium to high orbit satellite relative to the Earth, where the satellite is at an altitude substantially greater than 20,000 kilometers. The inventive system includes plural transmitters located within 20,000 kilometers of the Earth for transmitting information relating to the ephemeris of each transmitter relative to the Earth and time. This information is received and processed onboard the satellite to provide ephemeris data.

In a specific implementation, the transmitters are GPS transmitters. One or more of the transmitters may be a ground or air-based pseudolite. Preferrably, the transmitters have a geometric dilution of precision of six or less. Each pseuodlite transmitter includes a power supply sufficient to ensure that the signal received by the medium to high orbit satellite is of sufficient signal strength (e.g., −170 dBw to −160 dBw).

Using one or more GPS pseuodlites and one or more GPS satellite transmitters, the ephemeris of a high or medium orbit satellite may be fixed precisely, inexpensively, in real time, in an autonomous manner.

BRIEF DESCRIPTION OF THE DRAWINGS

FIGS. 11(a–h) depict perspective views of the Earth from the GEOs separated in longitude by 45° to illustrate that a global network of 12 pseudolites can be deployed to support numerous GEOs in space in accordance with the teachings of the present invention.

DESCRIPTION OF THE INVENTION

Figure 1:
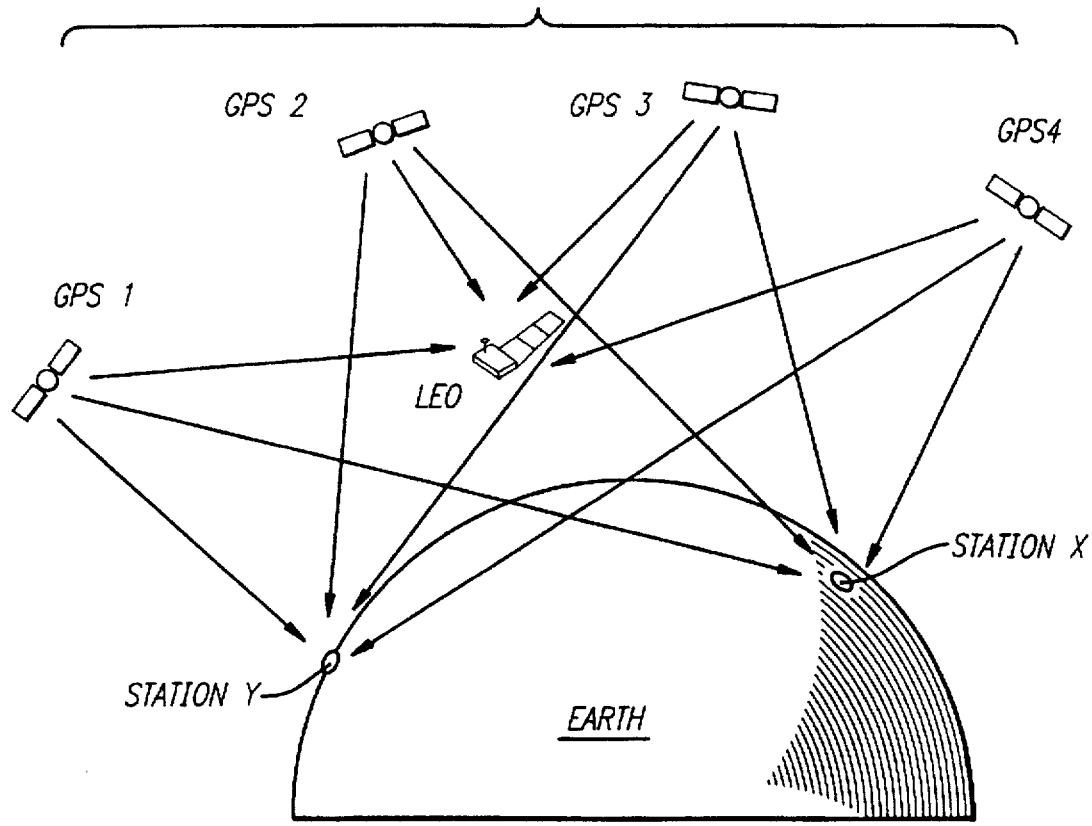
FIG. 1 depicts a low earth orbit (LEO) satellite equipped with a GPS flight receiver tracking a set of GPS satellites simultaneously with ground receivers in accordance with conventional teachings.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The GPS satellite system was designed and funded by the US Department of Defense (DoD)—The Air Force, for its precise navigational needs. On the other hand, civilian communities, realizing the constant availability of this state of art navigational beacon, have developed a host of other applications. The use of a space hardened GPS flight receiver on board an Earth satellite for its navigation, attitude and orbit determination, is one of such applications. The flight receiver tracks the high precision navigation signals from the constellation of 24 GPS satellites, which are distributed evenly in six orbital planes, with inclinations of 55°. These satellites are at 20,200 km altitude, and each of them maintain an orbital period of about 12 hours. The GPS satellites broadcast signals at two L-band carrier frequencies (L1 at 1.57542 GHz and L2 at 1.22760 GHz), towards the Earth. Each carrier is modulated with pseudo-random square-wave code, a C/A (coarse acquisition) code on L1, and a P (precise) code on both L1 and L2. The Y-code is used to encrypt the P-code which is commonly known as anti spoofing (AS).

The carrier signals, modulated by pseudorandom code, allow measuring the absolute time delay between a GPS transmitter and a receiver. This time delay includes the travel time between the transmitter and the receiver, the unknown transmitter and receiver clock biases in addition to the noise, and the unknown effect of the medium (based upon the location of the receiver, it may include ionospheric and tropospheric delays). The GPS receiver simulates a replica of these codes and correlates them with the received signals, from which a pseudorange to each of the visible satellite can be established. The pseudorange is simply the range biased by above mentioned unknown clock offsets. By using these pseudorange measurements together with the satellite ephemeris and the clock information broadcast by the respective GPS satellites, the receiver determines its location. The three components of the position vector and the clock offset can be solved with a minimum of four satellites in view. Several factors can affect the final accuracy of the estimated receiver position. The most important is the geometric configuration of the satellites in view. The effect of the measurement geometry on accuracy is generally expressed in terms of GDOP (Geometric Dilution of Precision). GDOP can be computed as the square root of the trace of the covariance matrix of various components of error states. The trace of the upper left 3×3 partition is the position error variance and the square root of this is known as PDOP (Position Dilution of Precision), whereas, the lower right element is the time error variance, whose square root is TDOP.

As part of Selective Availability (SA), DoD intentionally degrades the qualities of the GPS broadcast ephemeris (e.g. the orbital elements and the atomic clock information) and by dithering of the oscillator on board the GPS satellite, it severely degrades the receiver position accuracy. The degradation due to SA can be eliminated completely by using the differential techniques of tracking. But the differential techniques may not be applicable for some space applications.

The traditional ground-based tracking techniques utilize ground antennas of the size 5 to 30 meters. The cost of operation ranges from a few hundred to several thousands dollars per hour. The complexities in scheduling for observation and data processing, maintenance of the physically larger antennas and the ground support staff, put a heavy burden on operation cost. The GPS techniques, on the other hand, utilize small commercially available flight receivers using smaller (few square cm) antennas at a much lower cost. Spacecraft and spacecraft instrumentation must be selected in order to balance the performance against cost. Power consumption, mass and the expenses for the development, fabrication, tests and operation are the reasons for higher costs. The GPS receivers available can be scaled to offer a comfortable way of trading off the power, mass and operation costs against navigation performance requirements. Performance means autonomous (real-time) position accuracy and ultimate orbital knowledge gained through post-processing of the flight receiver data combined with the ground network data.

Based upon their steady state altitudes for diverse applications, the Earth orbiting satellites can be distinctly divided into three different categories. First is the broad category of low Earth orbiters (LEO). These satellites orbit the Earth in their circular or near circular orbit with altitudes ranging from a few hundred kilometers to a few thousand kilometers. The signals directed towards the Earth from the GPS satellites are ideal to be received by these satellites. The navigation of these satellites, therefore, can readily be accommodated by GPS techniques.

The second category is for those satellites with altitudes above 10,000 kilometers. Diverse class of geosynchronous (GEO) satellites fall into this category. NASA's Tracking and Data Relay Satellites (TDRS) are an example of satellites in this category.

The third category of satellites are characterized by their highly elliptical orbits, which may have perigees of a few hundred kilometers and apogees of tens of thousands of kilometers. Satellites in Molniya orbit are of this category.

The GPS satellite beam-widths are specially designed to illuminate users on Earth or near-Earth. The half-widths of the main beam are 21° and 27° at L1 and L2 frequencies, respectively. A user at an altitude of about 3500 km falls outside the mainbeam of a given GPS satellite for a fraction of time. There will be no GPS illumination from above for the user at altitudes greater than 20,000 km (GPS altitude). The regular up-looking GPS method is no longer applicable to these high altitude satellites. The satellites in second and third categories spend a high percentage of their orbit time outside the main beam of the GPS satellites and therefore pose a special challenge in achieving high precision orbits. In the next section methods using GPS techniques as applicable to different categories of the satellites in accordance with the teachings of the present invention are discussed.

Four methods are disclosed herein to determine the Earth satellite orbits. Some methods are suited to provide absolute autonomy to different degrees of accuracies, while some would provide highest accuracy with a minimum of ground support.

Figure 10:
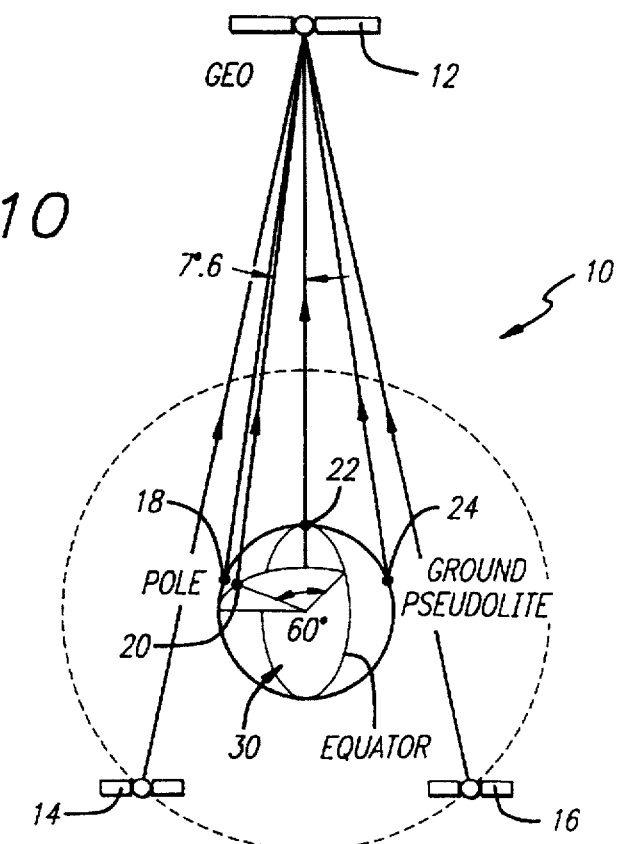
FIG. 10 depicts a GPS flight receiver onboard a GEO satellite simultaneously observing signals from GPS satellites as well as from ground pseudolites in accordance with the teachings of the present invention.

The four methods are:
1. Up-Looking GPS (FIG. 1)
2. Down-Looking GPS (FIG. 2)
3. Inverted GPS Tracking or GPS-Like Tracking (FIG. 6)
4. Down-Looking GPS with Ground Pseudolites (FIG. 10)

The terminologies up and down-looking GPS have originated from the orientation of the receiver antenna. For the users at altitudes lower than GPS, their antennas need to be looking-up, whereas, for the users at higher altitudes than GPS, their antennas need to be looking down, to receive any GPS signals. In the sections to follow the use of these methods for satellite orbit determinations are disclosed.

1. Up-Looking GPS

All the low Earth orbiting satellites in the first category can adopt this methodology.

FIG. 1 graphically demonstrates how the GPS receiver on board a low Earth orbiter (LEO) can use the antenna looking upward to track the signals from multiple GPS satellites.

The first high quality dual frequency GPS flight receiver was flown on board the Topex/Poseidon (T/P) in August of 1992. The T/P and a set of ground stations observed the same set of GPS satellites simultaneously yielding highest accuracy of only a few cm with operational data processing. (See Bertiger, W. I., Y. E. Bar-Sever, E. J. Christensen, E. S. Davis, J. R. Guinn, B. J. Haines, R. W. Ibanez-Meier, J. R. Jee, S. M. Lichten, W. G. Melbourne, R. J. Muellerschoen, T. N. Munson, Y. Vigue, S. C. Wu, T. P. Yunck, B. E. Schutz, P. A. M. Abusali, H. J. Rim, M. M. Watkins, and P. Willis; *GPS Precise Tracking of Topex/Poseidon: Results and Implications*, JGR Oceans Topex/Poseidon Special Issue, Vol 99, No. C12, December 1995.)

The accuracy requirement was established by the studies related to precise geodesy. The simultaneous measurements from the ground stations were combined to nearly eliminate the effects of clock errors and effects of GPS ephemeris errors due to SA. The main advantage of this method is that the robust observation geometry at the user satellite can provide an autonomous onboard orbital solution. When the T/P tracked GPS data was combined with other simultaneously observed ground GPS data, its precise orbital solution could be obtained without any dynamic model constraint. Although traditionally the dynamic models are used to improve the orbit accuracy, the dynamic model error themselves are the principal limitations of these approaches.

The 1300 km altitude of T/P keeps it above most of the ionosphere, reducing its effect to a minimum. The extensive tuning of the gravity field, and detailed solar pressure and thermal radiation models provided one of the best satellite dynamics models ever used. The orbit determination of T/P was degraded only marginally when single frequency data was used. (See Bertiger, W. I. and S. C. Wu; *Single Frequency GPS Orbit Determination For Low Earth Orbiters*, ION, National Technical Meeting, January 1996.) The accuracy of the single frequency GPS/MET orbits were also compared with its dual frequency reduced dynamic orbit solution [Bertiger and Wu, 1996]. The single frequency orbit solution accuracy was of the order of 25 cm in radial and cross track and 70 cm in along track components. The duel frequency solution showed 5 cm in radial and cross track and 10 cm along track components. The GPS/MET orbits the Earth from an altitude of 715 km; here the GPS signals are affected significantly by ionospheric delay. But the results indicated that a GPS receiver capable of observing all GPS satellites in view can determine good quality orbits even at lower altitudes, without much detailed force modeling (not in comparison to the T/P satellite dynamics model).

This finding is very important for the possible precise autonomous orbit determination by using the GPS flight receivers onboard the user satellites. Centimeter level accuracy is not necessary for most of the space missions and this experiment shows the potential of using a single frequency receivers onboard a satellite for orbit determination at a significantly smaller price tag. Majority of the spaceborne GPS flight receivers available today are intended for the low Earth satellites in the first category. Based upon the "GPS Standard Positioning Service Signal Specification", all the users worldwide will have the Standard Positioning Service (SPS) available to them providing positional accuracies (at 95% probability) of 100 m in horizontal, 156 m in vertical and the timing accuracy of 340 nsec. (See Paige, E; *Global Positioning System Standard Positioning Signal Specification*, Letter of Promulgation from Assistant Secretary of Defense, US Pentagon, Dec. 8, 1993 [OASD(C3I)/ T&TC3, 6000 Defense Pentagon, Washington D.C. 20301].) The GPS receivers have demonstrated much better performance in practice. A GPS flight receiver can typically provide positional accuracy of 80–100 m autonomously. For the best accuracy, data from the ground can be combined with the flight data, even in such case the whole process can be highly automated and the results can be obtained in near-real time.

2. Down-Looking GPS

The idea of gaining possible autonomous navigation and orbit determination in the higher altitudes is attractive as it minimizes the ground support to a large extent. The GPS satellites are kept at the optimum altitudes in order to help navigate any user on or near the Earth's surface. The signal transmitted from GPS satellites are directed towards the geocenter. Satellites with altitudes higher than GPS can only observe the spilled illumination from the GPS satellites on the far side of the Earth with the help of down-looking antennas. This is depicted in FIG. 2.

Figure 2:
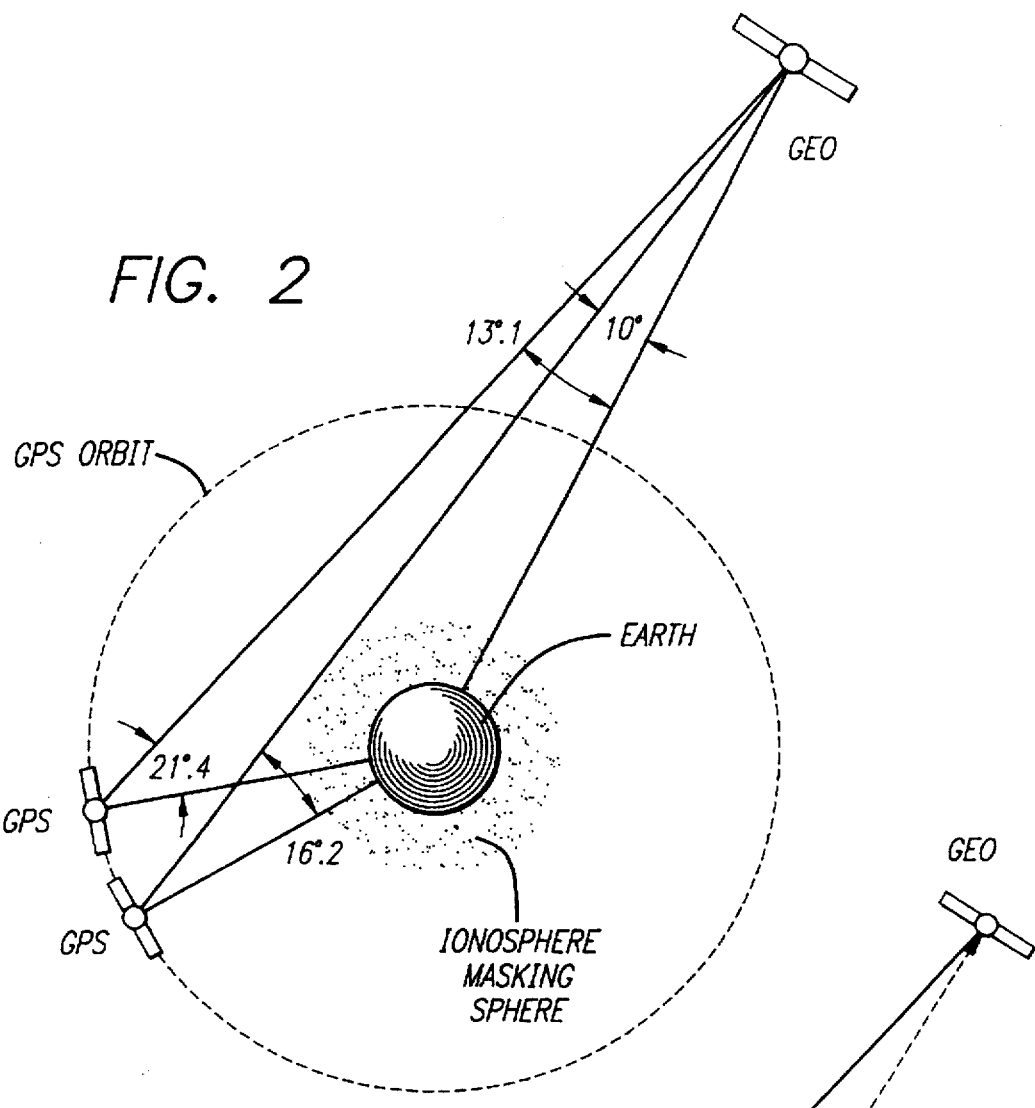
FIG. 2 illustrates the application of a down-looking GPS technique by a geosynchronous satellite (GEO) to observe GPS signals spilled over the limb of Earth.

FIG. 2 illustrates the application of a down-looking GPS technique by a geosynchronous satellite to observe GPS signals spilled over the limb of Earth. Although the user satellite would be able to establish a line of sight to GPS satellites, the number of useful GPS satellites are those which fall within the annular region delineated on the inside by the Earth blockage and on the outside by the beam-width of the GPS signals. In accordance with the present teachings, space radiation hardened (100 Krad) GPS tracking receivers are mounted onboard such satellites to track these signals spilled from the limb of Earth. As mentioned earlier, the half-widths of the main beams are 21° and 27° for L1 and L2 frequencies, respectively. The Earth subtends an angle of about 28° at the GPS altitude. Due to these constraints, the GPS satellite availability is not as abundant as one would expect for the low Earth orbiter. On average, signals from two GPS satellites at any given time (maximum of three and minimum of zero) would be available for observation at GEO altitude [Kronman and McElory, 1994]. Most of the satellites will have two data collection periods, which are broken up by the inner Earth cone. Only few satellites will have data collection periods not broken by the Earth cone. The data collection duration is estimated to vary from 30 minutes to 2 hours. Approximately 12 hours per day is estimated to be the total GPS data collection time. Owing to this relatively weaker observability, many of the parameters such as the solar radiation pressure coefficients and GPS satellite orbits can not be recovered reliably. But at a geosynchronous altitude, however, the perturbative acceleration due to the nonsphericity of the Earth is highly attenuated and there is negligible effect of atmospheric drag. The proper modeling of the forces acting on such spacecraft is less problematic.

The GPS measurements made by these satellites are sensitive to the selective availability (SA), where the intentional dithering of the GPS clock and ephemerides become very significant. For higher accuracy it would require a military-class (P-code) receiver on-board the user satellite to combat the SA effect. Covariance analyses indicate that this technique yields orbit accuracies at the sub-10 m level with the availability of decryption module. In contrast, without the decryption module, the position error reach the level of 80–100 m. The longer data arcs do not appreciably improve the accuracy. When the decryption module was not available, the dithering of the GPS clocks can introduce errors as high as 32 m into the pseudorange observable. Analyses indicate that the GPS ephemeris error is degraded to 30 m, GPS clocks to 17 m and the data noise to 3 m to account for SA dithering. Two hour tracking from GEO gives a 4.5 km position error, mostly due to large data noise accounting for the SA clock dithering. After 24 hours of tracking the position error was reduced to 60 m. The unadjusted parameters are the dominating sources of errors.

Figure 3:
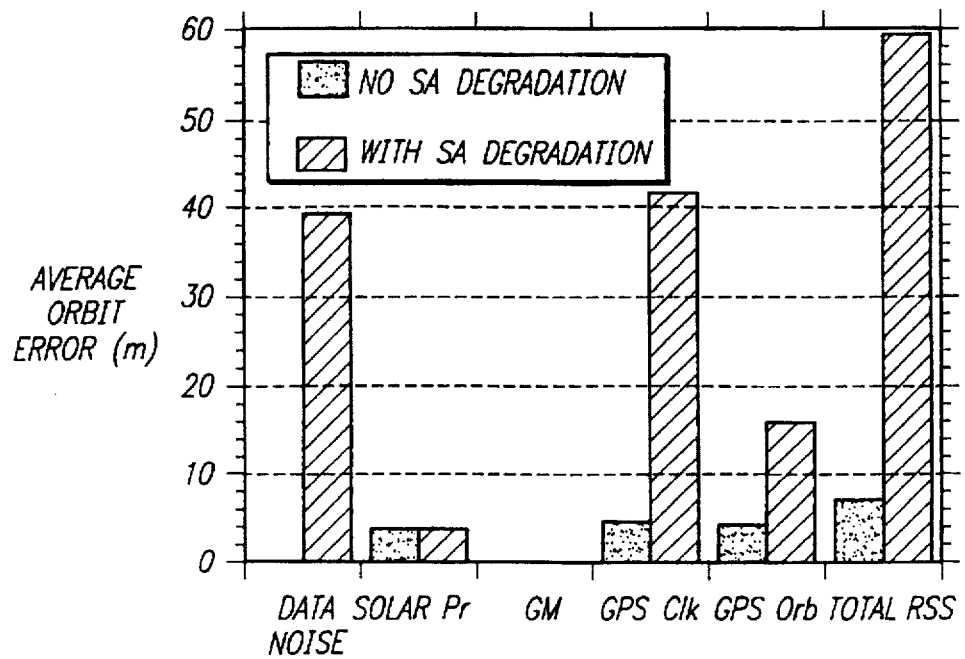
FIG. 3 is a graph which shows a breakdown of geosynchronous satellite (GEO) orbit error for 24 hour data arc using the down-looking GPS technique.

FIG. 3 shows a breakdown of the GEO orbit error for a data arc length of 24 hours. The errors with or without the decryption module are presented here. The dominating error sources with decryption are the GPS clocks and ephemerides. The high quality pseudorange measurements show a negligible amount of data-noise error. But, for the flight receiver without the decryption module, the SA degradation make the GPS errors increase by several orders of magnitude. The data noise error contribution becomes quite significant in such cases. The error due to the dithering of the GPS clocks can introduce effective range errors as high as 60 m in the pseudorange observables. (See Davis, E. S., W. G. Melbourne, and T. P. Yunck; *GPS Applications to Space-based Remote Sensing Missions: Coping with Denial of Accuracy*; Proceedings of the 2nd International Symposium of Positioning with GPS, Ottawa, 1990.) Without the decryption module, the total RSS error due to all considered parameters on the orbit of a down-looking GEO is of the order of 60 m (FIG. 3).

The multipath experienced at GEO altitude, due to the reflected signal from the Earth's surface itself, is another independent source of error.

Figure 4:
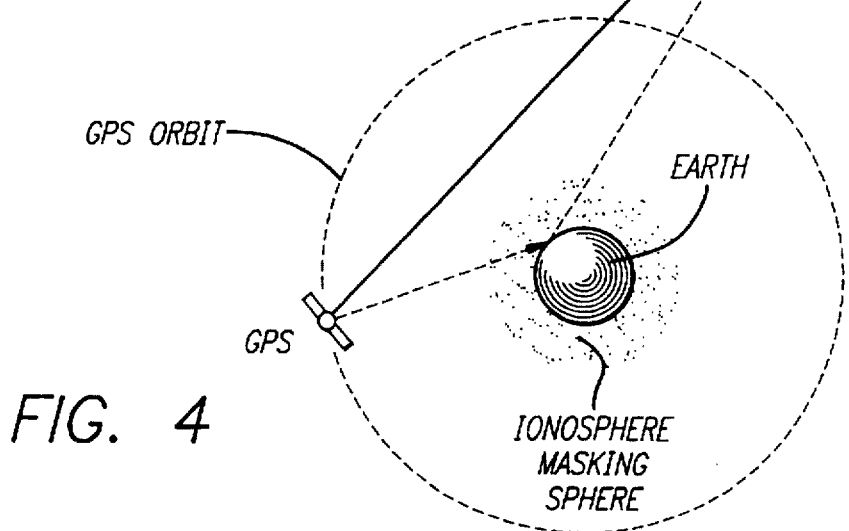
FIG. 4 shows depicts multipath at a GEO due to reflection of a GPS signal from the Earth's surface.

FIG. 4 shows depicts multipath at a GEO due to reflection of a GPS signal from the Earth's surface. Due to the apparent fixed location of a GEO with respect to Earth, the multipath effect does not cancel each other out as it would for the satellites revolving around the Earth.

Figure 5:
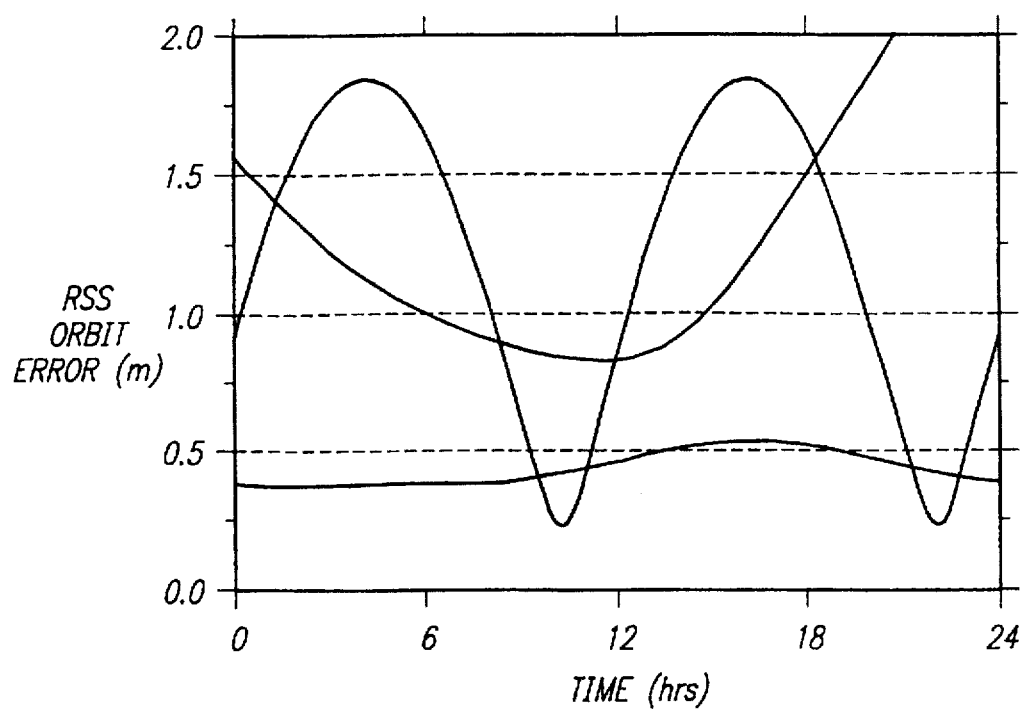
FIG. 5 is a waveform showing orbit error as a function of time to illustrate multipath error effect on the GEO orbit.

FIG. 5 shows the multipath effect on the GEO orbit determination. It shows larger effects on both the along and cross tracks. The cross track error fluctuates between 1 m to 9 m, where as, the along track effect lies between 4 m and 12 m. The radial effect is about 2 m. The multipath error contribution on the orbit determination can be as large as 10 m.

3. Inverted GPS tracking or GPS-Like Tracking

The key to exploiting the precision inherent in GPS tracking, in this case, is to use the same GPS ground receivers for tracking simultaneously the geosynchronous satellite along with multiple GPS satellites.

Figure 6:
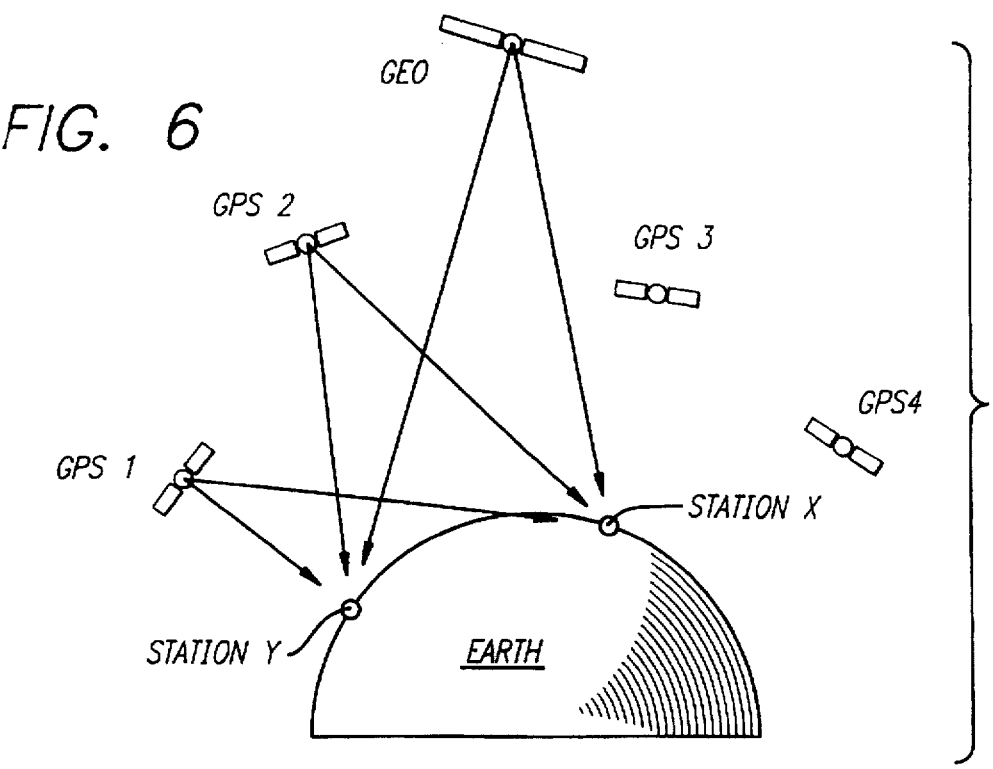
FIG. 6 shows a GPS-like signal from a GEO and GPS signals being tracked simultaneously by ground receivers in accordance with the teachings of the present invention.

FIG. 6 shows a GPS-like signal from a GEO and GPS signals being tracked simultaneously by ground receivers in accordance with the teachings of the present invention. The tracking performance can be visualized by assuming a hypothetical GPS satellite at a geosynchronous altitude >36,000 km. The orbit accuracy of a GPS satellite would degrade from 30–50 cm to about 3 m. Such degradation results from the limited dynamic information available while tracking a geostationary orbiter (note Å12 hr orbital period of GPS satellites). Such a geostationary GPS-like satellite can be tracked with a minimum of three ground stations. As the number of ground stations increase, the accuracy of the orbit determination increases.

Generally Ku (12.5–18 GHz) with 100 MHz bandwidth is considered for GPS-like transmission (GLT), so that, the tones can be spaced to produce the one way range data with 5 cm data noise over a 1-min averaging interval. An off the shelf miltichannel GPS receiver can simultaneously track GLT as well as GPS signals with minor hardware adjustments. In such cases, the GPS and GLT signals utilize different front ends of the flight receiver. This effectively introduces a slowly varying bias in GLT, which can wander as much as 1 nsec (30 cm). The expected orbit accuracy of a GEO with three ground stations is about 10–15 m, it can be improved to 3–5 m with more ground stations. An evenly distributed set of ground stations in northern and southern hemisphere can improve the tracking geometry for better estimation of the satellite orbits.

The effect of various error sources on a GEO orbit using this strategy was studied by performing another separate covariance analysis. A ground network of twelve stations, distributed evenly over continental US, Alaska and Hawaii, was adopted to simulate the simultaneous observation to GEO and GPS satellites.

In order to demonstrate the effect of ionospheric delay on the GEO orbit, it was assumed that all 12 sites were occupied by single frequency receivers. A vertical ionospheric delay of 0.75 m (1s) was used for the consider analysis. The change in range due to the ionosphere is typically 1–10 m.

Figure 7:
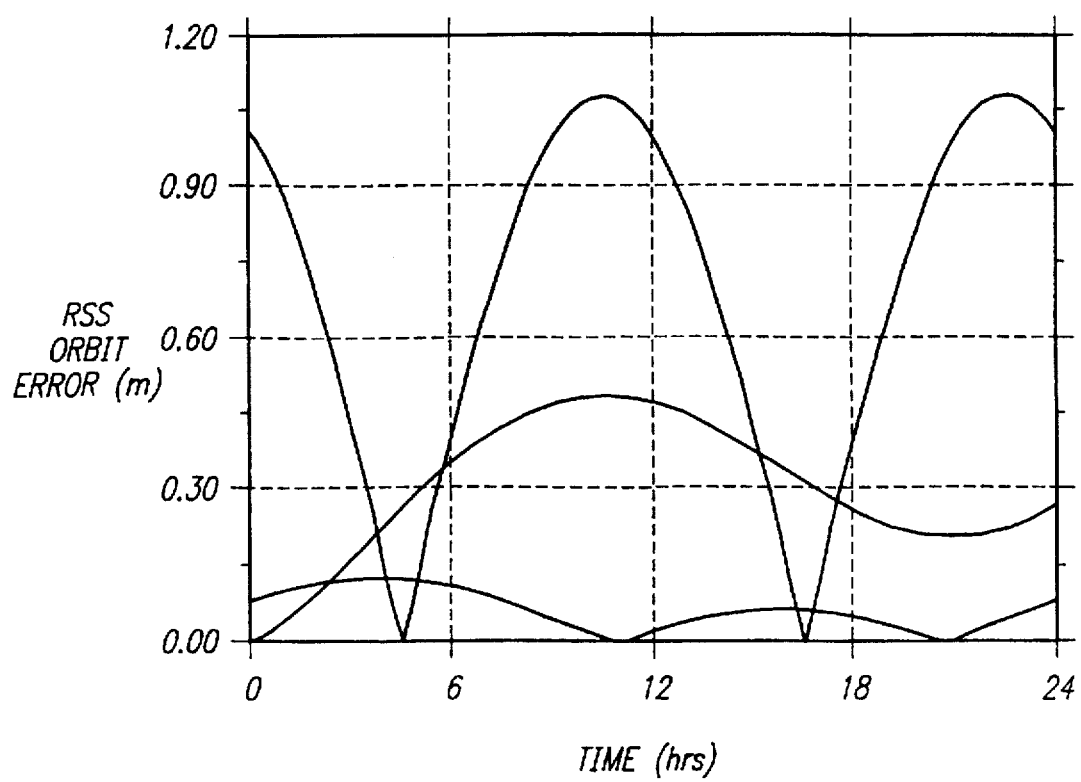
FIG. 7 is a waveform showing orbit error as a function of time to illustrate the ionospheric effect on the GEO orbit.

FIG. 7 plots the ionospheric effect on the three orbital components of the GEO. The most dominant is the cross track error, which fluctuates between 0–1 m, with an RMS value of 68 cm. The RMS error along the along track is 30 cm.

Figure 8:
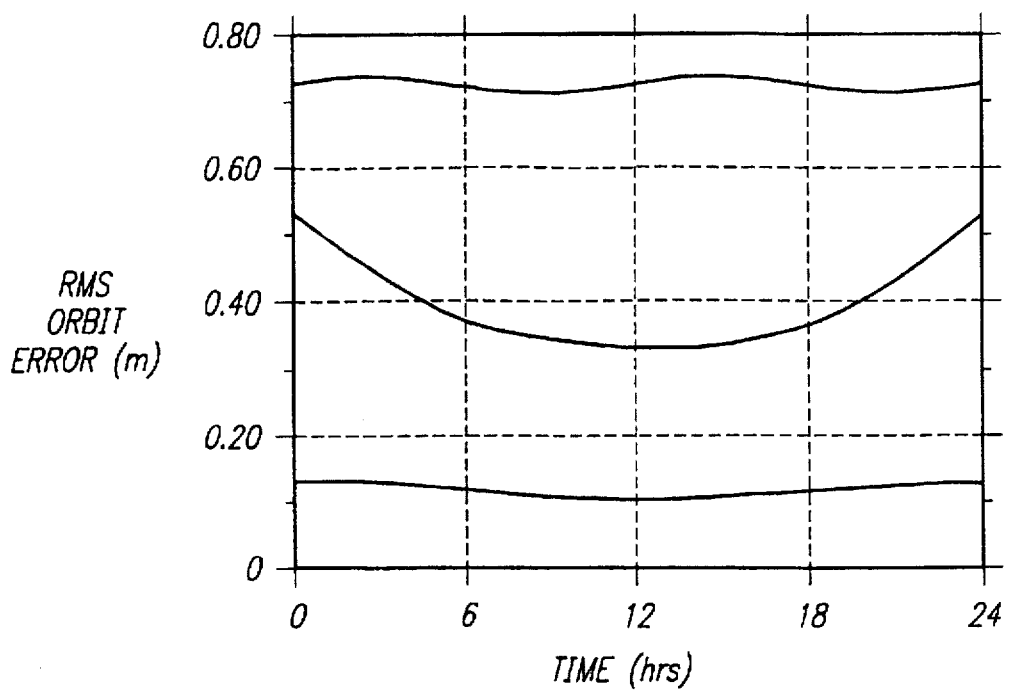
FIG. 8 is a waveform showing orbit error as a function of time to illustrate effect of data noise on GEO orbit.
Figure 9:
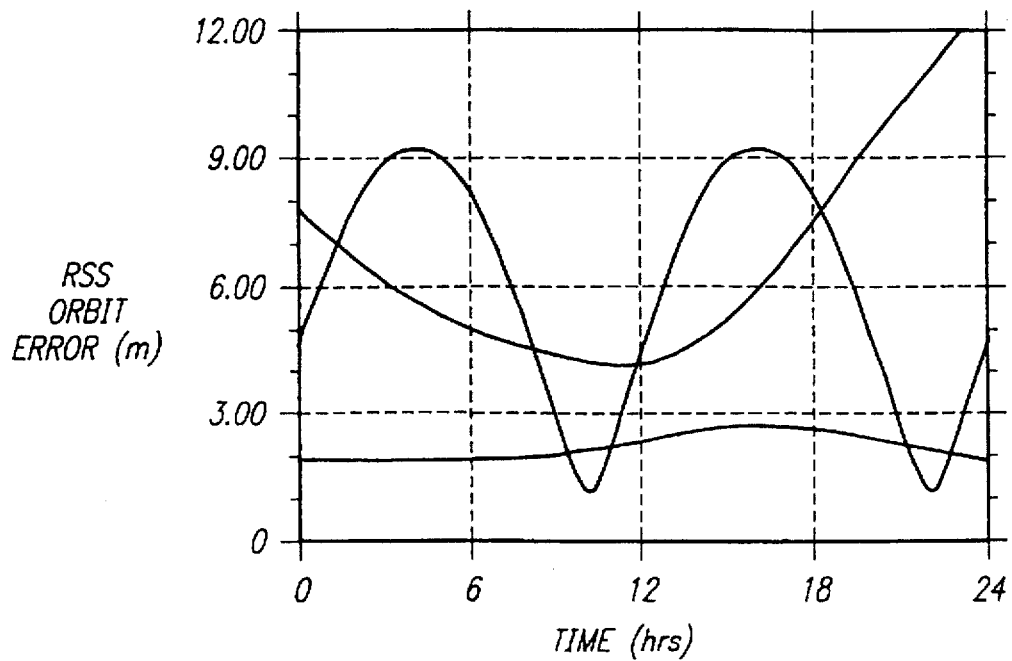
FIG. 9 is a waveform showing orbit error as a function of time to illustrate RSS orbit error due to data noise, multipath, ionosphere and station location.

FIG. 8 shows the effect due to data noise in all three components. The cross track error is again relatively significant with 72 cm in RMS. This is mainly due to the fact that there was no tracking sites in the southern hemisphere to balance the number of sites concentrated mainly in continental US, north of equator. The overall error can be reduced very significantly by evenly distributing the ground sites globally. FIG. 9 gives the total effect on the GEO orbit when the tracking stations are equipped with a only a single frequency receivers. The effect due to the station location seems to be insignificant at this point as compared to the effects due to ionosphere, multipath and data noise. The overall RSS GEO orbit error is estimated to be 9.27 m.

As an application of this method the results from an experiment involving INMARSAT are of interest. (See Kelecy, T. M., A. Brown, W. Bertiger, S. Wu and S. M. Lichten; *Orbit and Ranging Analysis of the INMARSAT AOR-West Geostationary Satellite*, ION 50th Annual Meeting, Colorado Springs, Colo., June 1994.) The INMARSAT-3 satellites carry on board a GPS L1 (1.57542 GHz) frequency transponder which can broadcast pseudo GPS signals. These signals can be used for navigation, timing and for disseminating integrity data or differential corrections for the GPS satellite. These GPS-Like signals can be received by the receivers with only slight hardware and software modifications. INMARSAT-3 constellation has four geostationary satellites which will provide redundant coverage over most of the Earth, forming a INMARSAT Geostationary Overlay (IGO). This service can provide an additional signal that would improve the available GPS and GLONASS satellite coverage. The IGO signal broadcast will be synchronized by the GPS satellite signals. This architecture can be used to precisely synchronize the IGO signal to a time reference. Since only a single satellite signal is required for precise time dissemination at fixed installations, the four INMARSAT-3 satellites can also provide redundant worldwide coverage for precise time dissemination. The effective uses of IGO are the calibration of the signal timing to a standard reference such as UTC and accurate knowledge of INMARSAT satellite orbit. The orbit accuracy reported achievable is at the RMS level of 5 m in radial, 80 m in cross track and 35 m in along track. The orbit accuracies can be improved further to meter level, by gathering data from a more evenly distributed global set of monitoring stations, performing group and atmospheric delay calibrations, and the use of carrier phase measurements.

4. Down-Looking GPS with Ground Pseudolites

The philosophy behind this method is a combination of methods 2 and 3 described earlier.

FIG. 10 depicts a GPS flight receiver onboard a GEO satellite simultaneously observing signals from GPS satellites as well as from ground pseudolites in accordance with the teachings of the present invention. In the preferred embodiment 10 of FIG. 10, a GPS flight receiver (not shown) is mounted onboard a user high altitude or GEO satellite 12. In addition to receiving GPS signals spilled from the limb of Earth by GPS satellites 14 and 16, the GEO 12 also receives the GPS-like signals from strategically located pseudolites 18, 20, 22 and 24 on the Earth's surface 30.

A pseudolite is a transmitter which mimics a GPS satellite from the Earth's surface. Pseudolites are commercially available with software to time synch the pseudolite with GPS signals from Stanford Telecom (STEL) and other such companies. The pseudolites 18, 20, 22 and 24 are situated at locations having coordinates known to a very high accuracy ($\leq 1$ cm) with respect to a geocentric reference frame (e.g. WGS '84). The transmitted GPS-like signal uses L-band, Ku, C or S-band. With L-band, there would be no modification required in a regular GPS flight receiver. If Ku or other bands are used, a downconverter is required to convert signals to L-band, so that all the incoming signals are treated as normal GPS satellite signals. With this implementation, the pseudolites and the GPS satellites observable from the far side of the Earth can be tracked simultaneously. This architecture can also be used to precisely synchronize all the ground pseudolites to one unique standard time reference. It is somewhat similar to method 3 above, however, in this case, the ground sites are broadcasting GPS like signals via pseudolites, rather than receiving them.

The accurately known coordinates of these strategically located pseudolites help to improve the orbital accuracy of the user satellite 12, even when the decryption module is not available. The key is to select the location of the ground pseudolite in order to improve the tracking geometry at the user satellite. Once the pseudolites 18, 20, 22 and 24 are strategically located, the user satellite is equipped to perform the autonomous navigation, station keeping and orbit determination to a higher accuracy. One of the attractive features of the present invention is that a set of globally distributed pseudolites can support any number of GEOs (with GPS flight receiver onboard) in space. Preferrably, the transmitters have a geometric dilution of precision of six or less. Each pseuodlite transmitter includes a power supply sufficient to ensure that the signal received by the medium to high orbit satellite is of sufficient signal strength (e.g., $-170$ dBw to $-160$ dBw).

Using one or more GPS pseuodlites and one or more GPS satellite transmitters, the ephemeris of a high or medium orbit satellite may be fixed precisely, inexpensively, in real time, in an autonomous manner.

Assuming that the GPS flight receiver onboard the GEO 12 has its receiving antenna lobe pointed towards the geocenter, the aspect angle to cover the entire visible surface of the Earth from a GEO is about 8°. According to this geometry, a GEO can easily see the pseudolites located as far as 70° in north and south latitudes and 70° in east and west longitude as measured from its foot print. Allowing for the topography and other manmade structures obstructing the line of site, the GEO can see the pseudolites positioned at 60° north and south latitude and 60° in east and west longitudes from its footprint (FIG. 10). A series of perspective views of the Earth from the GEO altitude can be charted to select the locations of the pseudolites in a global network.

FIGS. 11(a-h) depict perspective views of the Earth from the GEOs separated in longitude by 45° to illustrate that a global network of 12 pseudolites can be deployed to support numerous GEOs in space in accordance with the teachings of the present invention. The visible stations may easily be the sites for the ground pseudolites to provide the best tracking geometry to simultaneously track them along with the GPS satellites from a GEO. FIGS. 11(a-h) show an example of such a set of globally distributed pseudolites for supporting numerous GEOs in space.

An experiment performed by Ferrage et. al. [1994] observed one way pseudorange and Doppler between the geosynchronous satellite and three widely distributed ground pseudolites. (See Ferrage, P., J-L. Issler, G. Campan, J-C. Durand; *GPS Techniques for Navigation of Geostationary Satellites*, ION GPS-95 Meeting, September, 1995.) It was assumed that the ground pseudolites are synchronized correctly. With the signal using Ku-band, it showed an RSS error of 23 m in position. The largest error (22 m) is on the along track component. The simultaneous observation of the GPS satellite and pseudolites can thus present a robust autonomous orbit determination system.

A combination of the strategies need to be adopted for highly elliptical orbit satellites. In general, these satellites would have 65% of their orbit above the GPS altitude. Methods 2 or 3 should be applied for the time above the GPS altitude. The rest of the time they can be treated as low Earth satellites. It is very important, for such satellite to decide whether GPS measurements should be observed for the entire orbit, or should wait till it passes its near Earth perigee and emerges back above GPS altitude in order to resume the GPS measurements. If it is to observe the GPS satellites for the entire orbit then the flight receiver should be capable of multiplexing between the up-looking as well as down-looking antennas onboard the satellite. Highly elliptical orbit can be used for orbit transfer from low Earth to GEO or higher orbits.

A typical example of highly elliptical orbit satellite is the Japanese VLBI Space Observatory program (VSOP) spacecraft. This satellite has perigee at about 1000 km and apogee at about 20,000 km. The position requirement in this satellite is 130 m and the velocity requirement is 0.4 cm/sec. The positional requirement can be met with ground-based Doppler tracking, but the velocity requirement, especially at perigee where the error can grow up to 2 cm/sec, can not be met with this method alone. Due to its wide range of altitudes, combination of various techniques should be considered to accomplish the accuracy required. For altitudes below 2,000 km, reduced-dynamic tracking should give steady-state acceleration sigma of 0.5 mm/sec$^2$ with a 15 minute time constant. But for higher altitudes the acceleration parameters are estimated as constants instead of treating them as process noise parameters. The up-looking GPS for the lower altitude can provide good accuracies of the order 1 m in position and 0.01 cm/sec in velocity. At higher altitude the error increases rapidly so that the error in position and velocity near apogee become 3 m and 0.05 cm/sec respectively. (See Wu, S. C., T. P. Yunck, S. M. Lichtert, B. H. Haines, and K. P. Malla; *GPS-Based Precise Tracking of Earth Satellites from Very Low to Geosynchronous Orbits*; Proceedings of National Telesystem Conference, Ashburn, Va., May 1992.)

TABLE 1

Summary of the Strategies for Orbit Determination Using GPS Measurements

| Strategies | Applications | Accuracy in meters | | On Satellite | On Ground |
|---|---|---|---|---|---|
| Up-Looking GPS | Low-Earth Satellite and Highly Elliptical Orbit Autonomous Low-Earth Orbit | Radial Cross_trk Along_trk RSS RSS | 0.03 <0.10 <0.10 <0.13 80–100 (with SA) | Space qualified GPS receiver 2-way data link <750 bps Space qualified GPS receiver | Ground tracking net + post process-ing soft ware for higher accuracy No ground support is necessary |
| Down-Looking GPS | High Earth Satellites Geosynchronous | RSS | 80 (with SA) 10 (w/o SA) | Space qualified GPS receiver On-board processing | |
| Inverted GPS tracking or GPS-Like Tracking (GLT) | Geosynchronous | Radial Cross_trk Along_trk RSS | 2.18 6.12 6.61 9.26 | Transmitter on board using Ku or C band Data uplink in about 50 bps | Ground tracking net with Ku band down converter Post Processing software for higher accuracy |
| Down-Looking GPS with Ground Pseudolites | High Earth Satellites Geosynchronous | Radial Cross_trk Along_trk RSS | 5 0 22 23 | Space qualified GPS and Pseudolite receiver On-board processing | Pseudolites transmitting Ku-band Data uplink in about 50 bps |

The current minimum power reception levels at the Earth's surface from GPS satellite signals is −160 dBw. For the higher altitude satellite or typically for a GEO, the GPS signal spilled from the limb of Earth has to travel about 68,000 km, and 36,000 km for signals from pseudolites. It is important to note that the geometric visibility may still not guarantee signal availability at the specific power levels. The GPS receivers commercially available today are designed to receive the signals from GPS satellites with a power level as low as −160 dBw. But due to considerable GEO to GPS distance, it is most likely that the received power level of the signal will be even less than −160 dBw. In any event, those skilled in the art will appreciate the need to ensure that the pseudolites are provided with a power supply sufficient to provide a signal in the range of −170 dBw to −160 dBw at the high orbit user satellite.

Another important parameter is the receiver signal to noise ratio ($C/N_o$) of the GPS signals. The overall $C/N_o$ ratio should be greater than the receiver sensitivity. At GEO altitude the GPS signals arrive within a narrow cone with half-cone angle of about 21° (FIG. 2). The visibility can be reduced to about two satellites even with a 12 dB in the maximum gain direction. A high gain antenna with a preamp between the antenna and the receiver would be necessary to receive the signal power level <−160 dBw. The geometry of GPS satellite and pseudolites should be chosen to provide a GDOP less than six at the user satellite. This can be insured by strategicly selecting the locations of the pseudolites in a manner well known to those skilled in the art.

For the down looking strategy, the worst case is considered for a maximum GPS-GEO aspect angle of approximately 13° (FIG. 2). A single frequency C/A code receiver is adequate for most of the purposes, however, a dual frequency receiver is required for higher accuracy. The signal coming through the ionosphere masking sphere (altitude approximately 1000 km) would give measurements embedded with strong ionospheric errors. If a single frequency receiver is in use, it is important to use some reliable ionospheric model (like Bent, Parameterized Ionospheric Model or PIM and IONO) to correct for the ionospheric delay or to use a flight receiver designed with its receiver processor to internally suppress all the data coming through the ionosheric masking sphere. The dual frequency receiver is capable of correcting for such ionospheric delays; this results in reducing the minimum aspect angle of 10° (FIG. 2) to 8°. This effectively enlarges the window size, with higher probability of viewing more GPS satellites while at the same time minimizing the ionospheric effect.

The GPS signals are strongest for the minimum GPS-GEO aspect angle (10°) and signal power level is weakest for the maximum GPS-GEO aspect angle. In the weakest case, the $C/N_o$ is considered to be 30 dBHz, which is the common acquisition threshold for commercially available receivers. Detailed link-budgets for various applications can be found presented in Ferrage et. al. [1995] and Kronman and McElroy [1994]. The highest ionospheric error (16 m) occurs near the masking sphere. The data noise in range and range-rate are typically of the order of 10 m and 1 mm/s respectively. The short term stability of the GPS and the receiver clocks are of the order $10^{-12}$ s/s and $10^{-11}$ s/s which can produce clock biases of 0.03 m and 3 mm/s in range and range-rate respectively. The Earth reflected multipath error (10 m) can be minimized by designing a receiver with narrow correlators. In strategy 4, where GPS and pseudolite signals are tracked, the pseudolites distributed evenly in northern and southern hemispheres provide a better control on the cross track component of the GEO orbit. The pseudolite signal multipath error (1 m) does not get as large as that for the GPS signals. If L-band is not available, the Ku-band signal could, in theory, provide pseudorange measurements with a random noise component of 1 cm averaged over 30 minutes. (See Haines, B., S. Lichten, R. Malla and S. Wu; *Application of GPS Tracking Techniques to Orbit Determination for TDRS*; Proceedings of Flight Mechanics/Estimation Theory Symposium, Goddard Space Flight Center, May 1992.) The pseudolites can be synchronized in time precisely to a reference with the help of the GPS time transfer. Thus, an autonomous orbit determination and the system synchronization can be performed simultaneously.

Table 1 summarizes the achievable accuracies for orbit determination using the four methods discussed herein. The down-looking GPS with or without pseudolites is capable of providing an autonomous system to maintain the orbit of a user satellite, while the other strategies provide partial-autonomy with minimal ground support. The inverted GPS with GLT (method 3) gives the best accuracy ($\leq 10$ m.) with a semi-autonomous system.

An autonomous precise orbit determination for low to high altitude satellites is possible with a space hardened GPS flight receiver. The GEO satellites pose a unique challenge due to the geometrical limitations and the lack of a strong dynamical signature in tracking data. This condition can be altered for a better geometry and signal strength by deploying a network of ground pseudolites, which in effect would work like the GPS satellites on ground. A globally distributed set of a few pseudolites can provide the obit determination capability to all the GEOs equipped with GPS flight receivers onboard.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for providing ephemeris data of a second object relative to a first object, said first object and said second object being separated by a distance substantially greater than 20,000 kilometers said system comprising:

transmitter means including plural transmitters located within 20,000 kilometers of the first object for transmitting information relating to the ephemeris thereof relative to the first object and time;

receiver means located on the second object for receiving said information; and processing means located on the second object for processing the information and providing signals relating to the ephemeris of said second object.

2. The invention of claim 1 wherein said transmitter means includes plural Global Positioning System transmitters.

3. The invention of claim 2 wherein at least one of said transmitters is a pseudolite.

4. The invention of claim 3 wherein the pseudolite includes power means for transmitting a signal to said second object in the range of $-170$ to $-160$ dBw at the second object.

5. The invention of claim 2 wherein at least two of said transmitters is a pseudolite.

6. The invention of claim 5 wherein each of said pseudolites includes power means for transmitting a signal to said second object in the range of $-170$ to $-160$ dBw at the second object.

7. The invention of claim 2 wherein a geometric dilution of precision of said transmitters is less than six.

8. The invention of claim 1 wherein said first object is a planetary body and said second object is a satellite.

9. The invention of claim 8 wherein said satellite is in a stationary orbit with respect to said planetary body.

10. The invention of claim 9 wherein said first body is the Earth and said stationary orbit is approximately 36,000 kilometers distant from the earth.

11. The invention of claim 10 wherein at least one of said transmitters is a pseuodlite disposed at or near the surface of the Earth.

12. The invention of claim 11 wherein one of said transmitters is in orbit above the Earth.

13. The invention of claim 12 wherein each of said transmitters is a Global Positioning System transmmitter and each of said receivers is a Global Positioning System receiver.

14. The invention of claim 13 wherein each of said pseudolites includes power means for transmitting a signal to said second object in the range of $-170$ to $-160$ dBw at the second object.

15. The invention of claim 14 wherein a geometric dilution of precision of said transmitters is less than six.

16. A system for providing ephemeris data of a satellite disposed in an orbit above the Earth greater than 20,000 kilometers, said system comprising:

transmitter means including plural Global Positioning System transmitters for transmitting information relating to the ephemeris thereof relative to the Earth and time, said transmitters being located within 20,000 kilometers of the Earth and having a geometric dilution of precision less than or equal to six;

receiver means located on the satellite for receiving said information; and processing means located on the satellite for processing the information and providing signals relating to the ephemeris of said satellite.

17. The invention of claim 16 wherein at least one of said transmitters is a pseudolite.

18. The invention of claim 17 wherein the pseudolite includes power means for transmitting a signal to said second object in the range of $-170$ to $-160$ dBw at the second object.

19. The invention of claim 18 wherein one of said transmitters is in orbit above the Earth.

20. A method for providing ephemeris data of a second object relative to a first object, said first object and said second object being separated by a distance substantially greater than 20,000 kilometers, said method comprising the steps of:

transmitting information relating to the ephemeris of plural transmitters located within 20,000 kilometers of the first object relative to the first object and time;

receiving said information with a receiver at said second object; and processing the information at said second object and providing signals relating to the ephemeris of said second object.

* * * * *